United States Patent [19]

Mizushima et al.

[11] 4,408,798
[45] Oct. 11, 1983

[54] VEHICLE SEAT STRUCTURE FOR TWO-DOOR TYPE VEHICLE

[75] Inventors: Yoichi Mizushima, Yokohama; Taketoshi Hosonaga, Tokyo; Takashi Murakami, Yokohama; Nikio Ujiie, Akishima, all of Japan

[73] Assignees: Nissan Motor Co., Ltd., Yokohama; Tachikawa Spring Co., Ltd., Akishima, both of Japan

[21] Appl. No.: 192,288

[22] Filed: Sep. 30, 1980

[30] Foreign Application Priority Data

Oct. 3, 1980 [JP] Japan ................................ 54-128985

[51] Int. Cl.³ ............................................ A47C 27/00
[52] U.S. Cl. ................................ 297/326; 296/65 R; 297/15; 297/335
[58] Field of Search ................. 297/326, 325, 15, 335, 297/336, 331; 292/DIG. 14; 296/65 R

[56] References Cited

U.S. PATENT DOCUMENTS

| | | | |
|---|---|---|---|
| 1,318,437 | 10/1919 | Eaton | 297/325 |
| 1,353,708 | 9/1920 | Barnett | 297/326 X |
| 1,732,169 | 10/1929 | Provost et al. | 297/326 X |
| 2,121,398 | 6/1938 | Dukes | 108/113 X |
| 2,565,666 | 8/1951 | Schaefer | 296/65 R |
| 3,155,408 | 11/1964 | Peras | 292/DIG. 14 |
| 3,317,175 | 5/1967 | Ford | 297/326 X |
| 4,194,782 | 3/1980 | Itoh | 296/65 R |

Primary Examiner—James T. McCall
Attorney, Agent, or Firm—James Creighton Wray

[57] ABSTRACT

An improved vehicle seat structure for a two-door type automotive vehicle having only a pair of front doors is inclinable about a pivot between front legs of front seat and floor panel. A pair of rear legs are releasable from the floor panel and pivotably secured to the seat. Actuator means operates to fold the rear legs below the seat responsive to inclining of the front seat so as to broaden the passage for letting on or off of passengers sitting in the rear seats of the vehicle.

12 Claims, 5 Drawing Figures

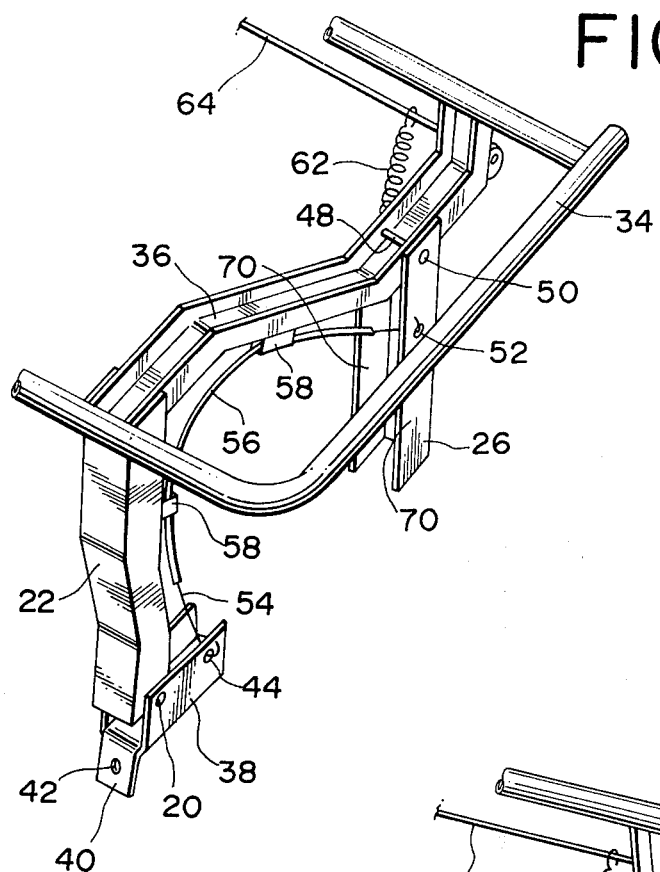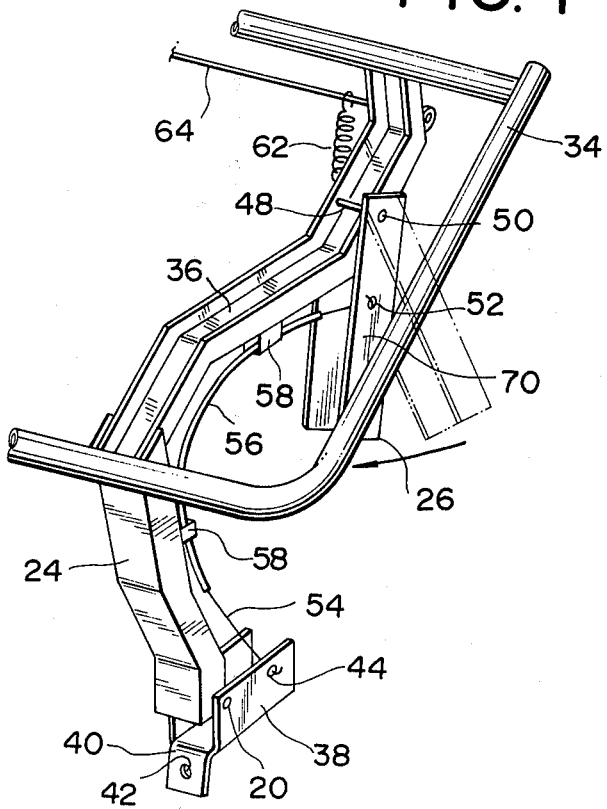

VEHICLE SEAT STRUCTURE FOR TWO-DOOR TYPE VEHICLE

BACKGROUND OF THE INVENTION

The present invention relates generally to a vehicle seat structure applicable for two-door type passengers' vehicle which has only a pair of front doors. More specifically, the invention relates to a strucutre of vehicle front seat structure applicable for two-door type vehicle, which front seat is integrally inclinable for forming passage for passenger seating in rear seat.

Generally, the two-door type vehicle having only front doors is provided with inclinable front seat for forming passage for the passengers seating in the rear seat. In conventional construction of such inclinable seat, each front leg of the vehicle seat is pivoted onto the vehicle floor panel so that it permits rotation of the vehicle seat thereabout. In this construction, the rear leg of the seat is necessarily releasable from the floor seat so as not to interfere with inclination of the seat. Each rear leg of the conventional seat construction is fixedly secured to the seat supporting frame. Therefore, when the seat is inclined, the rear leg protrudes backwardly from the rear end of the seat to possibly interfere with the passenger passing therethrough or to injure the passengers' foot.

SUMMARY OF THE INVENTION

Therefore, it is an object of the present invention to provide an improved vehicle seat structure for a two-door type vehicle, particularly to provide an improvement in a vehicle front seat construction which front seat is integrally inclinable about it's pivot and will not interfere with or injure the passengers getting in or out of the vehicle.

Another and more specific object of the present invention is to provide a vehicle front seat structure having rear legs foldable according to inclination of the seat and the rear legs can be semi-automatically folded below the seat.

According to the present invention, there is provided an improved vehicle seat structure having rear legs pivoted onto a seat supporting frame. An actuation means is also provided for automatically folding the rear leg in response to inclination of the seat.

According to the preferred embodiment of the present invention the vehicle seat comprises a seat, seat supporting means and front and rear legs. The front legs are pivotably secured onto the vehicle floor panel so that it serves as a pivot for inclination of the vehicle seat. On the other hand, the rear legs are pivoted onto the seat supporting means and are pivotable thereabout so that it can be folded below the seat in response to inclination of the seat. For accomplishing the folding function, there is provided actuation means for urging the rear leg toward the lower portion of the seat to fold the rear leg therebelow. Returning means for returning the rear leg to the normal position is further provided to the vehicle seat which normally urges the rear leg in opposite direction to the direction of force applied by the actuating means.

The other objects and advantages of the present invention will be understood from the detailed description in terms of the preferred embodiment of the present invention.

BRIEF DESCRIPTION OF THE DRAWINGS

The present invention will become understood from the detailed description given herebelow and from accompanying drawings of the preferred embodiment of the present invention, which, however, should not be taken as limitative of the present invention but for elucidation and explanation only.

In the drawings:

FIG. 3 is a perspective view of a part of the vehicle seat of FIG. 1 in which the seat cushion is omitted and is shown in normal position;

FIG. 4 is a similar view to FIG. 3, but showing a inclined position of the seat.

DESCRIPTION OF THE PREFERRED EMBODIMENT

Figure 1:
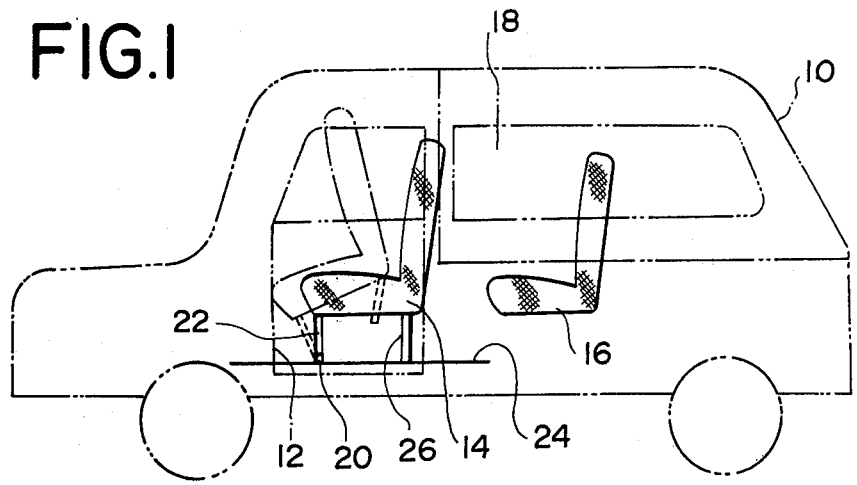
FIG. 1 is a fragmentary side elevational view of a preferred embodiment of a vehicle seat structure according to the present invention, in which a two-door type automotive vehicle having only the front doors is illustrated in chain line.

Referring now to the drawings, particularly to FIG. 1, there is illustrated in chain line a two-door type automotive vehicle which has only front doors for letting on or off of passengers. A pair of front doors 12 are provided on both sides of a vehicle body 10 adjacent the front end of a vehicle compartment 18 defined in the vehicle body. Front and rear seats 14 and 16 are provided in the vehicle compartment 18. In such vehicle, the front seats 14 are inclinable about pivots 20 for forming passages for passengers sitting in the rear seat 16 when the passengers get on and off. Generally, front supporting legs 22 of the front seat 14 are hinged onto a floor panel 24 of the vehicle body 10 by the pivot 20.

In the preferred construction according to the present invention, rear supporting legs 26 are pivotably connected with support frames 28 extending along both sides of the front seat 14 and are not secured onto the floor panel 24 so that they can release from the floor panel and can be folded below the seat when the seat 14 is inclined. Thus, the passengers' passage formed by inclination of the front seat 14 can be broadened compared with the conventional seat construction.

Now we describe the preferred construction of the vehicle seat structure according to the present invention in detail in terms of the preferred embodiment with reference to FIGS. 2 to 5 of the accompanying drawings. In the description given hereafter, the features corresponding to the features briefly discussed with respect to FIG. 1 will be represented by the same reference numerals for simplification of explanation and for avoiding confusion in understanding of the present invention.

Figure 2:
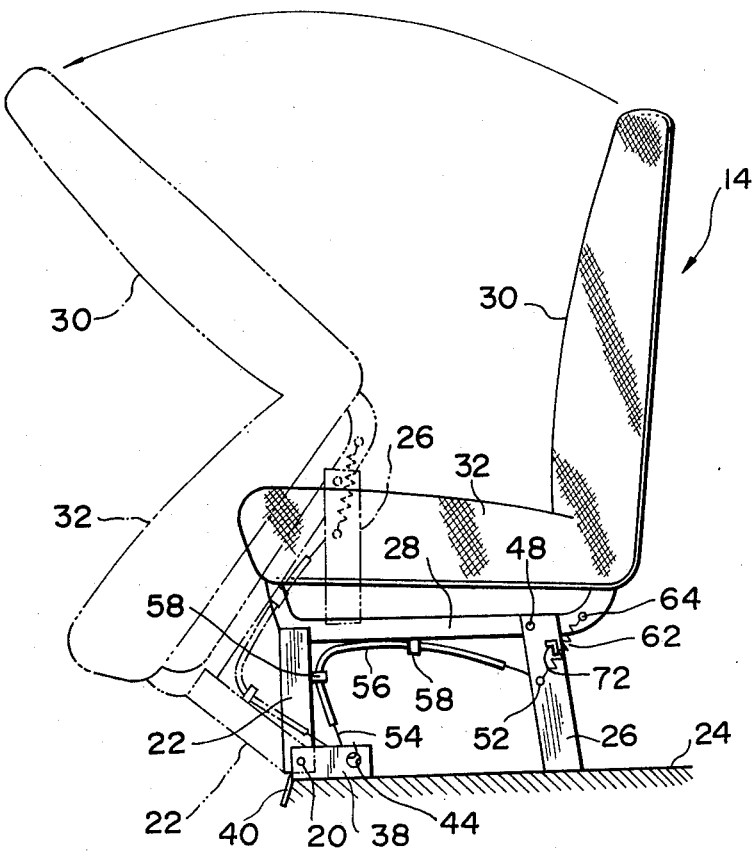
FIG. 2 is an enlarged side elevational view of the vehicle seat of FIG. 1.

Referring to FIGS. 2 and 3, there is illustrated a preferred embodiment of a vehicle seat structure according to the present invention. In FIG. 2, the chain line shows a inclined position of the front seat 14. The front seat 14 comprises a seat back 30 and a seat cushion 32. The front seat 14 is supported by a seat support 34. As clearly shown in FIG. 3, the seat support 34 is formed by hollow pipes which are assembled into a substantially rectangular frame in order to support the edge of the seat cushion 32. The seat support 34 is fixedly mounted on a pair of support frames 36 of channel shape in section and being extending along side edges of the seat cushion 32. A front supporting leg 22 of channel shape in section is fixedly engaged with the front end of the support frame 36 at the upper end thereof. The lower end of the leg 22 is pivoted to a fitting bracket 38 and is pivotable about a pivot 20. The bracket 38 is sectionally channel shaped in configuration and has a bent tongue 40 with an opening 42. The tongue portion 40 is engaged with the floor panel 24 and secured thereon. A small opening 44 is formed in the vertical portion of the bracket 38 adjacent the rear end thereof.

A pair of openings are formed in the support frame 36 in lateral alignment adjacent the rear end thereof. A pivot 48 is received in the openings at both ends thereof. A rear supporting leg 26 of sectionally channel shape is provided with a pair of openings 50 adjacent the upper end thereof. The ends of the pivot 48 are also received in the openings 50 of the rear leg 26 in order to pivotably secure the leg to the support frame 36. The rear leg 26 is formed with a small opening 52 at the intermediate portion thereof. To the openings 44 of the front leg 22 and 52 of the rear leg 26, both ends of an actuating wire 54 are engaged. The actuating wire 54 is coaxially covered with an outer tube or wire 56 so that it can move along the latter.

In the preferred construction, the actuating wire 54 is made by non-expansible material and cannot be expanded by force of stretching.

On the front leg 22 and the supporting frame 36, a plurality of guide members 58 are secured. The outer tube or wire 56 is secured along the front leg 22 and the supporting frame 36 by the guide members 58. The rear leg 26 is further formed with a small opening adjacent the upper end thereof. The opening receives one end of a return spring 62. The other end of the return spring 62 is connected to a lateral rod 64 provided along the rear edge of the seat cushion 32. Both ends of the rod 64 are secured on the vertical portion 66 of the supporting frame 36 by a brackets 68.

Between both side portions 70 of the rear leg 26, a substantially L-shaped channel 72 is secured. The channel 72 acts as stopper for counterclockwise motion of the leg 26 in FIG. 2.

It should be noted that the support frame, front and rear legs are not necessarily formed by a substantially C-shaped channel but can be embodied otherwise in any suitably shaped members such as solid bars and so on. Further, the actuating wire is not necessarily covered by the outer tube or wire for freely move therethrough, it only requires free movement in secured condition to the support frame and the front leg. For example, the guide member can per se act as the outer member for permitting the wire free movement with respect to thereto. Additionally, the manner of providing the return spring can be embodied otherwise in any suitable manner.

Figure 5:
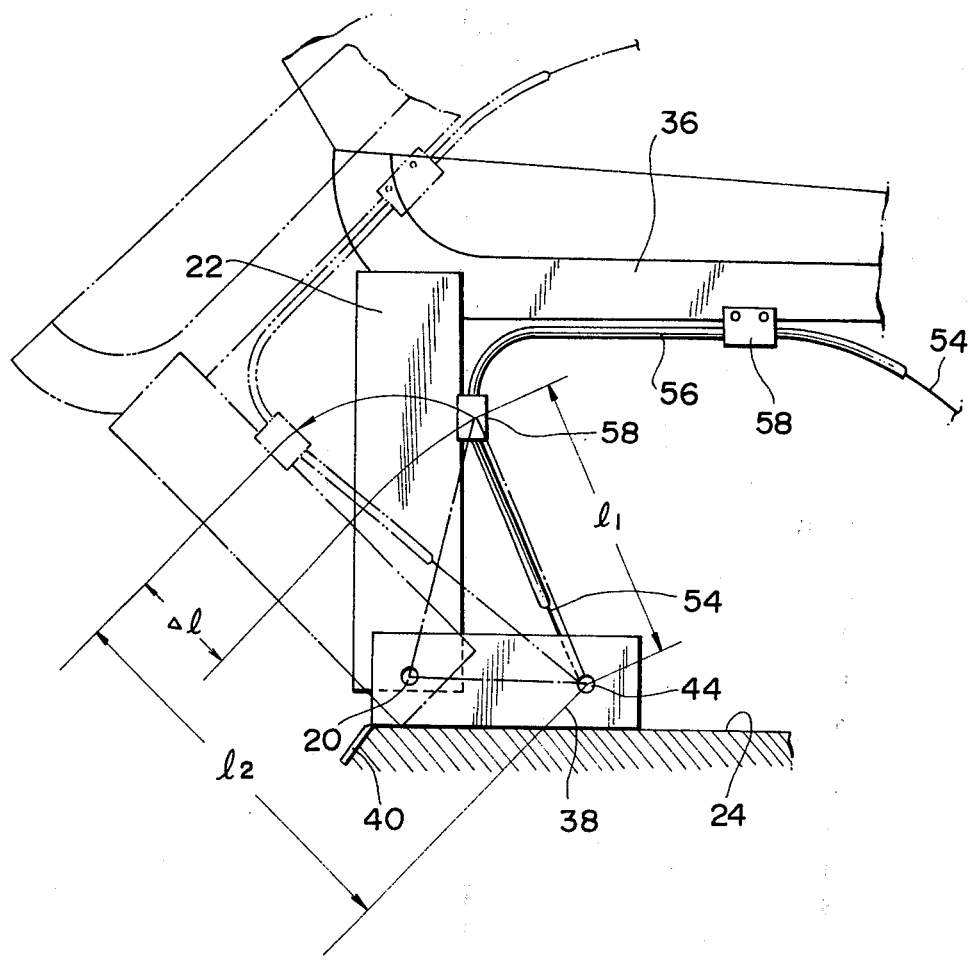
FIG. 5 is a partial side elevational view of the seat of FIG. 2 showing dimensional relationship between the normal position and the inclined position.

The function of the above-explained preferred embodiment will be explained hereinafter with reference to FIGS. 4 and 5. As shown in FIG. 5, when the front seat 14 is inclined for forming a passengers' passage, the front seat 14, the seat support 34 and the support frame 36 are rotated about the pivot 20. According to this, the front leg 22 is also rotated in counterclockwise direction in FIG. 5 to incline. At this time, the dimension between the opening 44 and the guide member 58 secured on the front leg 22 is varied from $l_1$ which is an initial dimension when the seat is in normal position, to $l_2$. Namely, when the front seat 14 is inclined, the dimension between the opening 44 and the guide 58 is expanded by an amount $\Delta l$ ($l_1 - l_2$). Here, since the actuating wire 54 is made from non-expansible material, the actuating wire 54 is pulled by varying of the dimension by the amount of $\Delta l$. By this, the other end of the wire 54 is moved in amount of $\Delta l$ in a lateral direction Therefore, the rear leg 26 is pulled by the actuating wire 54 to rotate about the pivot 48 in a clockwise direction in FIG. 4 against the force of return spring 62.

The inclining motion of the front seat 14 is finally stopped by abutting the top of the seat back against the inner surface of the vehicle roof 74.

Thus, as illustrated in chain line in FIG. 2, the rear leg 26 of the front seat 14 is folded below the seat and broadens the passengers' passage formed by inclination of the front seat 14.

When the front seat returns to normal position, the rear leg 26 is pulled by the return spring 62 and returned to the normal position according to reducing of expanded dimension $\Delta l$. At this time, counterclockwise motion of the rear leg 26 is limited by abutment of the channel 72 against the lower portion of the supporting frame 36. Thus, the front seat 14 is returned normal position.

Thus, the preferred embodiment of the vehicle seat structure hereabove described can fulfill all of the objects and advantages sought in the invention.

Although the present invention has been explained in detail in terms of the preferred embodiment, this should not be taken as limitative of the invention. Any minor modification and change of elements can be involved in the scope of the invention except departing from the principles of the present invention. Therefore, the present invention should be understood as including all of the possible embodiments within the scope of the appending claims.

What is claimed is:

1. A vehicle seat structure comprising:
    a seat mounted on a vehicle floor;
    a front and rear legs for supporting said seat on said vehicle floor;
    first pivot means for pivotably connecting said front legs on said vehicle floor;
    second pivot means for pivotably connecting said rear legs with said seat so that said rear legs are rotatably secured to said seat with said second pivot means at the top thereof;
    actuator means for moving said rear legs to fold relative to said second pivot means below the seat according to inclination of said seat about said first pivot means, said actuator means being provided along front leg and lower portion of said seat and secured to said front leg and lower portion of said seat by guides fixed thereto, and said actuator means being responsive to dimensional variation of said rear legs and said floor panel, and
    returning means for returning said rear legs to an initial position responsive to returning of the seat to normal position.

2. A seat structure as set forth in claim 1, wherein said actuator means comprises a wire connecting the first pivot means and the rear legs.

3. A seat structure as set forth in claim 2, wherein said wire passes through an outer cylindrical member and is movable through said outer member, which outer member is secured to said front legs and said seat.

4. A seat structure as set forth in claim 2 or 3, wherein said wire is made of non-expansible material.

5. A vehicle seat structure comprising:
a seat including a seat supporting member provided below a seat cushion;
front legs fixed to said seat supporting member at the top thereof and pivoted onto a vehicle floor at the lower end;
rear legs having upper ends pivoted at said seat supporting member so that they are folded below said seat responsive to inclining of said seat about a pivot, and lower ends releasably mounted onto said vehicle floor;
actuator means for moving said rear legs between a normal first position and a second folded position, said actuator means being responsive to dimensional difference between a rear end of said seat and a pivoting portion between said vehicle floor and said front legs in order to move said rear legs below said seat in response to inclination of the seat, said actuator means including an inner wire and an outer cylindrical member which permits motion of said inner wire therealong and said outer member is secured along said front leg and lower portion of said seat with guides fixed to said front leg and the lower portion of the seat; and
returning means for urging said rear legs to said first position and operative to return said rear leg to said first position when said seat is returned to the normal position.

6. A vehicle seat structure as set forth in claim 5, wherein each of said front legs are pivoted onto said floor through a fitting bracket which is provided with means for connecting said actuator means to said floor.

7. A vehicle seat structure as set forth in claim 6, wherein said actuator means comprises an inner wire and an outer cylindrical member which permits motion of said inner wire therealong, said inner wire member being connected to said bracket at one end thereof and to a rear leg at the other end.

8. A vehicle seat structure as set forth in claim 5 or 6, wherein said returning means comprises a spring urging said rear legs backwardly to return said rear legs to normal position, said spring being provided between said rear legs and a rear portion of said seat.

9. A vehicle seat structure as set forth in claim 5, 6, or 7, wherein said rear leg is provided with stopper means for limiting backward motion of the rear leg when the set returns to normal position, said stopper means abutting against a lower edge of said seat to limit further motion of said rear leg.

10. A vehicle seat structure as set forth in claim 8, wherein said rear leg is provided with stopper means for limiting backward motion of the rear leg when the seat returns to normal position, said stopper means abutting against a lower edge of said seat to limit further motion of said rear leg.

11. A tiltable seat for an automotive vehicle comprising:
a seat frame;
a seat back fixedly connected to said seat frame in an approximately vertical position at a fixed angle;
a front leg supporting a front portion of said seat frame on a vehicle floor;
first pivot means between a lower end of said front leg and said vehicle floor for pivotably securing said lower end of said front leg onto said vehicle floor;
a rear leg supporting a rear portion of said seat frame;
second pivot means between an upper end of said rear leg and said seat frame for providing a pivotable connection therebetween, said second pivot means permitting movement of said rear leg between a first normal position and a second folded position;
actuation means for moving said rear leg from said first position to said second position when said seat frame with seat back is tilted about said first pivot means,
said actuation means including an inner wire and an outer cylindrical member which permits motion of said inner end therealong;
guides fixed to said front leg and the lower portion of said seat frame and holding said outer cylindrical member along said front leg and the lower portion of said seat frame; and
return means for moving said rear leg from said second position to said first position when said seat frame with said seat back is returned to a normal upright position.

12. A tiltable seat for an automotive vehicle comprising:
a seat assembly including a seat frame and a seat back fixed to said seat frame;
a first support supporting said seat assembly on a vehicle floor having a first pivot permitting said seat assembly to tilt with respect to said vehicle floor;
a second support supporting said seat assembly on said vehicle floor and positionable between a first position wherein said second support supports said seat assembly on said vehicle floor and a second position in which said second support is folded with respect to said seat assembly;
actuator means for moving said second support from said first position to said second position when said seat assembly is tilted about said first pivot, said actuator means including an inner wire and an outer cylindrical member;
guides secured to said first support and lower portion of said seat frame and holding said outer cylindrical member along said first support and the lower portion of said seat frame;
return means for moving said second support from said second position to said first position when said seat frame with said seat back is returned to a normal upright position; and
stopper means for limiting backward motion of said second support when said seat assembly returns to said normal position, said stopper means abutting against the lower edge of said seat frame to limit further motion of said second support.

* * * * *